Patented Oct. 2, 1951

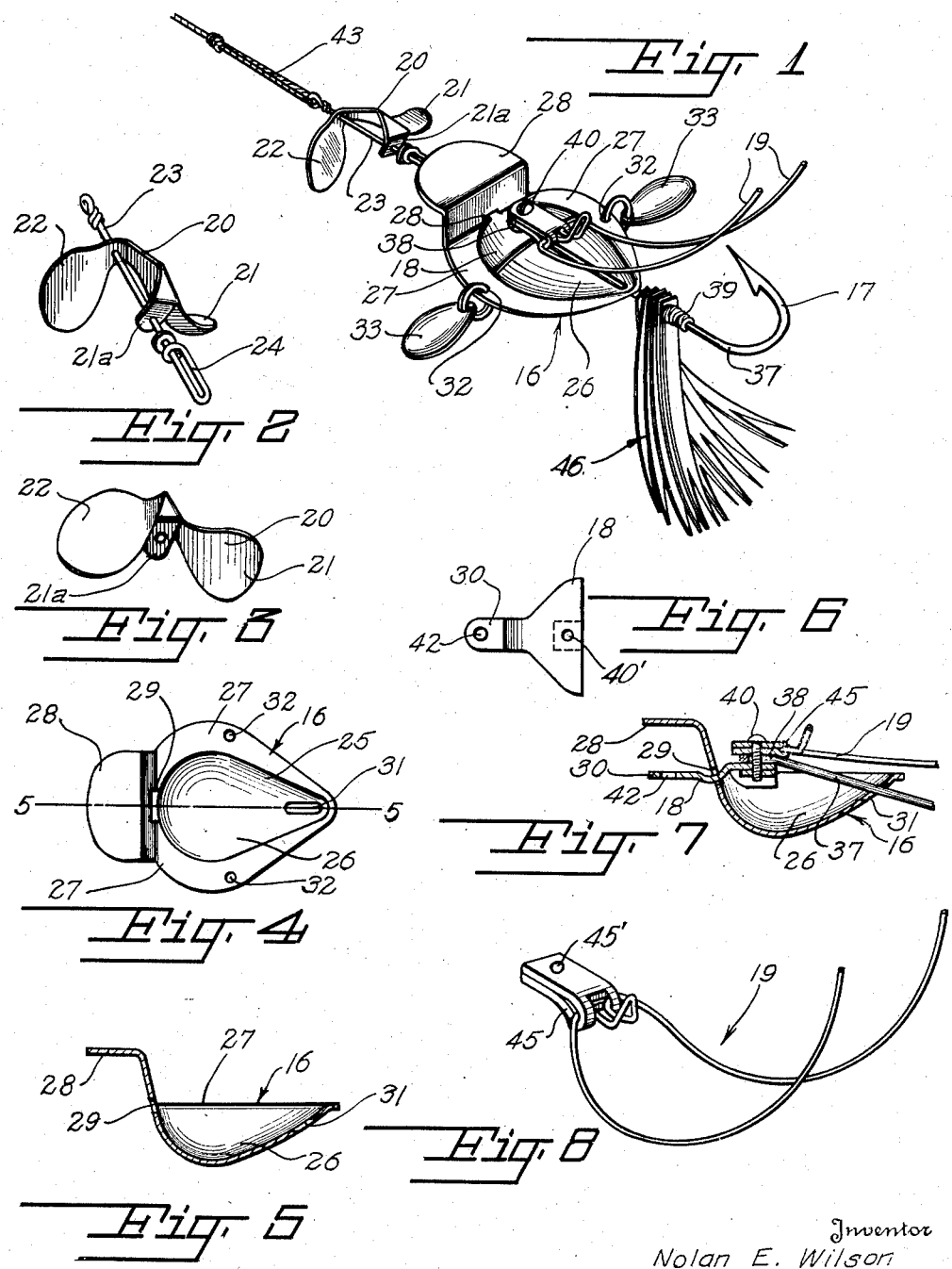

2,569,792

UNITED STATES PATENT OFFICE 2,569,792

FISH LURE

Nolan E. Wilson, Homer, La.

Application September 12, 1946, Serial No. 696,543

5 Claims. (Cl. 43—42.36)

The present invention relates to a fish lure with a spinner and interchangeable lure bodies of various shapes and sizes and this combination may be used by fishermen either for trolling, casting or cane pole fishing.

The advantage of carrying a plurality of bodies makes it possible for the fisherman to combine the lure in any manner he wants and with different kinds of hooks, body shapes, weights, and colors, most suitable for the occasion and the water condition; so that he may carry a complete collection of lures at smaller cost and requiring less space in one compartment of his tackle box, where ordinarily only one complete fish lure was carried.

The lure body and the hook are joined together by a single link member and the link and hook are held firmly and rigidly together by a single screw. This arrangement has another advantage, namely, that the line pull acts directly on the hook without stressing the lure body.

Another feature resides in a weed deflector consisting of a pair of antenna-like, slender fingers trailing behind the lure body, to which it is also attached by the same link member in such a manner that it can be easily removed if not needed.

The invention will be understood from the subjoined specification with the aid of the attached drawings, wherein like reference numerals refer to the same details in the different views.

Figure 1 is a perspective view of the spinner mounted on a spindle, the lure body, the connecting link, the hook and the weed deflector, all connected together and attached to a fish line;

Figure 2 is a perspective view of the spinner mounted on a spindle;

Figure 3 is an end view of the spinner.

Figure 4 is a bottom plan view of the spoon or lure body alone;

Figure 5 is a longitudinal sectional view through the spoon taken substantially on the line 5—5 of Figure 4;

Figure 6 is a plan view of a connecting link for assembling the different parts together;

Figure 7 is a partial longitudinal section view through the lure body, the connecting link, the hook and the weed deflector of Figure 1;

Figure 8 is a perspective view of a pair of weed-removing fingers.

This fish lure has been named "Wench."

The complete fish lure as seen in Figure 1 consists of a spinner 20 mounted on a spindle, a spoon or body 16, a fish hook 17, a connecting link 18, and a weed deflector 19.

The spinner 20, see Figures 2 and 3, has two blades 21, 22 which form a unit and are set one horizontal and one perpendicular to the shaft. They constitute the spinner wings which give the illusion of an insect in flight when in motion. The horizontal blade produces the wing illusion and the perpendicular blade produces the body illusion. This proves a greater attraction for any game fish than any single blade spinner or even an ordinary double blade spinner, where the blades are not set at such an angle. The blades are attached to revolve on a conventional steel or brass spindle 23 aided by the side arm 21a. This spindle 23 has a snap loop 24 for easy assembling.

In Figures 1, 4 and 5 is shown one of the types of spoons 16 which, in plan view, is substantially heart or pear-shaped with its pointed end to the rear and has its central portion depressed to form a bowl 26 which is surrounded by a narrow, flat flange 27. The spoon has a forward vertically offset longitudinally directed lip 28 at one end in offset parallel relation to the plane of the flange.

At 29 is shown a short, narrow transverse slot formed in the body partially above the plane of the flange 27 to receive the projecting tongue 30 on the connecting link 18. In the pointed rear end of the spoon is formed a narrow slot 31 extending lengthwise thereof through which the shank of the fish hook 17 enters. Midway between the ends of the spoon are holes 32, each of which is in a flange 27 as shown most clearly in Figure 4. In these holes 32 are loosely fastened a pair of small, flat flippers 33 working in imitation of those on a fish.

The spoon body represented in Figures 1, 4 and 5 is made of metal, plastic, or a combination thereof, polished to have a bright, shiny surface both inside and out. The body can be made of different sizes, weights, and colors to suit the fisherman for various waters and for different depths, whether he wants to fish in deep or shallow water or to troll and for the particular fish he desires to catch.

The hook 17 has a long straight shank 37 with an eye 38 at the securing end and an anchor lug 39 midway between the ends. This lug may consist of solder or other metal welded on the shank, and has a rough surface. When the lure is assembled, this reinforcement lug 39 is located right behind the pointed rear end of the spoon 16. This lug has for its function to provide a hold for ornamental attractions or baits around the hook and gives the fisherman a chance to use his own ingenuity by creating his own ideas of attractions.

In Figure 6 is shown the connecting link 18 for securing the hook 17 and the weed deflector 19 firmly together by means of a single screw 40 which has one end secured in the aperture 40' formed through the link substantially midway between its sides. To do this the hook eye 38 is first entered through the slot 31 at the rear end of the spoon 16 and then secured by a screw 40 to the connecting link 18 together with the weed deflector 19. The tongue 30 of said link 18 is then pushed through the slot 29 in the spoon 16, while the link is pressed into the concave portion or bowl of the spoon, which will hold it firmly therein. The tongue 30 has a small hole 42 at its end in which the snap loop 24 of the spindle is attached, and the forward end of the spindle finally is secured to the end of the fish line 43.

It will be noted that in this manner a direct pull is exerted from the fish hook to the fish line without affecting the spoon.

The weed deflector 19 is shown in Figure 8 as consisting of two or more flexible spring fingers connected together at one end by an integral transverse member and attached to a lip 45 provided with a hole 45' for the screw 40. This deflector may be removed from the lure if not needed.

In Figure 1 one or more strips 46 of pork rind, rubber or the like are indicated as tied onto the hook shank 37 in front of the roughened lug 39 by which they are retained.

It is to be understood that the invention as herein disclosed may be varied from the details described and shown without departure from the spirit of the subjoined claims.

I claim:

1. A fish lure comprising a spoon body having a bowl and a forward end provided with an offset longitudinally extending lip, the body having a slot formed therethrough adjacent to the lip and a second slot formed therethrough at the opposite end thereof, a link positioned across and bridging the bowl of the spoon and having a tongue extending forwardly through the first slot beneath the lip, said tongue at its forward end being formed to facilitate the attachment of a line thereto, a hook having a long shank extending inwardly through the second slot toward the link, the hook having a barb and means securing the hook shank to the link, the hook barb being positioned at a substantial distance rearwardly of the spoon.

2. A fish lure of the character described in claim 1 in which the hook shank securing means comprises an eye formed at the end of the shank and positioned against one side of the link, the link having an aperture therethrough, a bolt passing through the eye and the link aperture and secured to the link, and a weed deflector attached to the bolt and comprising curved resilient fingers extending rearwardly and curving away from the hook shank to a position on opposite sides of the barb.

3. A fish lure of the character described in claim 1, wherein said link has an aperture formed therethrough substantially midway between its sides, a weed deflector comprising a pair of relatively long resilient fingers connected together by an integral transversely extending portion at two adjacent ends of the finger, means coupling said transversely extending portion with the link comprising a body having an aperture overlying the aperture of the link, a bolt passing through said body aperture and through said link aperture, said fingers extending rearwardly across the edge of the spoon at opposite sides of the hook shank, and said hook shank securing means including said bolt and an eye forming a part of the shank and positioned against a side of the link.

4. A fish lure comprising a spoon body of substantially pear-shaped outline having a bowl and a laterally extending encircling edge flange, the body at the larger end thereof having a forwardly directed lip in offset parallel relation with the plane of the flange, the body having a second slot formed therethrough at the end adjacent to the lip and a slot formed therethrough at the opposite end thereof, a link member positioned across and bridging the bowl of the spoon at the forward end thereof and having a tongue extending forwardly through the first mentioned slot and in spaced relation with the underside of the lip, said tongue at its forward end being formed to facilitate the attachment of a line thereto, said link having an aperture therethrough substantially midway between its ends, a hook having a relatively long shank extending through the second mentioned slot and terminating in an eye registering with said aperture, means passing through the eye and aperture for securing the shank to the link, and flat elements loosely connected at opposite sides of the spoon to said flange.

5. A fish lure of the character described in claim 4, with a weed deflector consisting of two relatively long spaced parallel fingers of resilient material, two adjacent ends of the fingers being connected by an integral transverse member, means connecting the transverse member of the deflector fingers to the link, said fingers extending rearwardly across the edge of the spoon on opposite sides of the hook shank.

NOLAN E. WILSON.

REFERENCES CITED

The following references are of record in the file of this patent:

UNITED STATES PATENTS

| Number | Name | Date |
|--------|------|------|
| 1,854,028 | Farley | Apr. 12, 1932 |
| 2,036,954 | Murray | Apr. 7, 1936 |
| 2,238,604 | Sabin | Apr. 15, 1941 |
| 2,265,482 | Hearn | Dec. 9, 1941 |
| 2,319,026 | Adam | May 11, 1943 |